Aug. 7, 1945.   C. L. DEWEY   2,380,952
PROPELLER SHAFT
Filed June 23, 1943
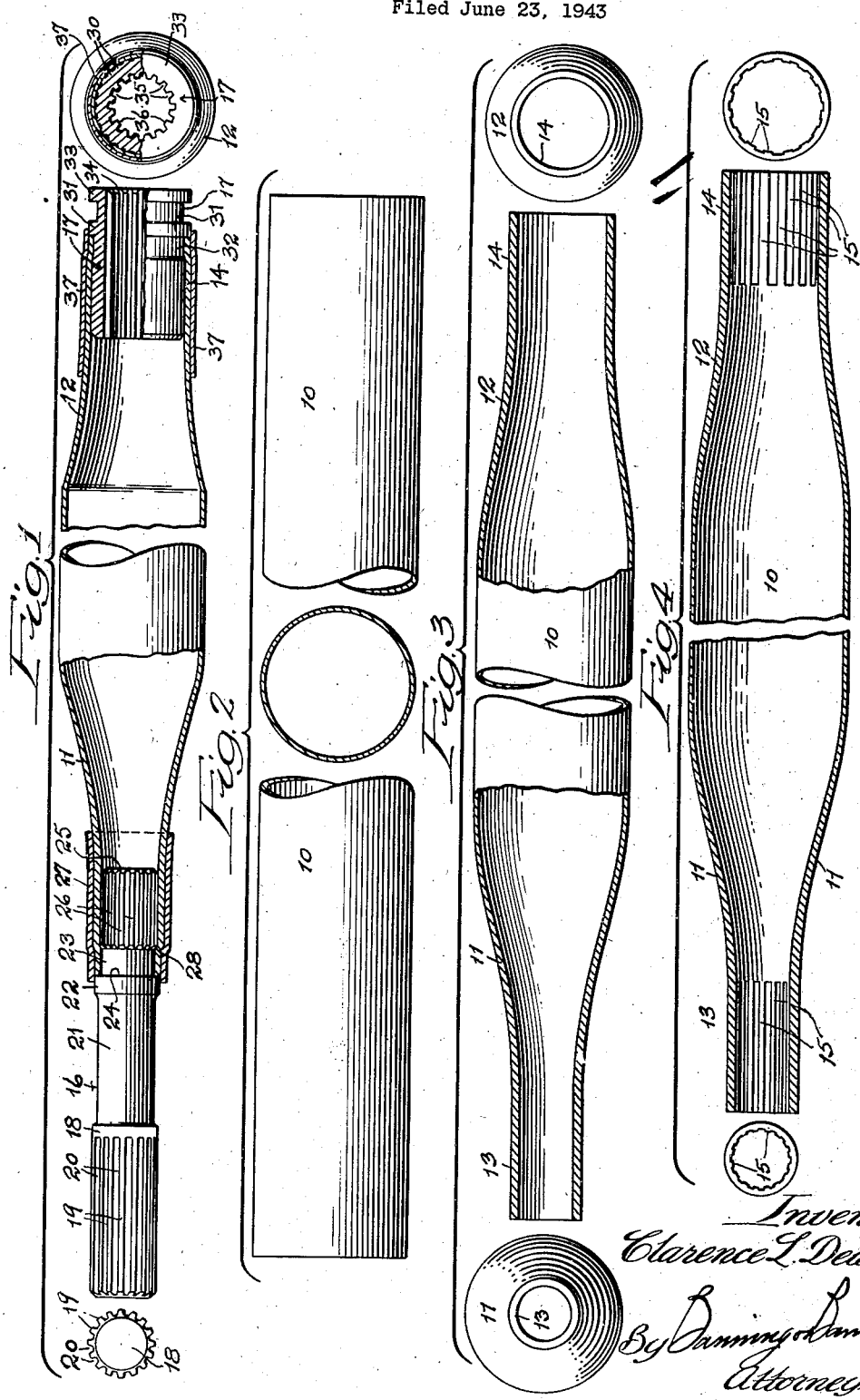
Inventor
Clarence L. Dewey,
By Banning & Banning
Attorneys.

Patented Aug. 7, 1945

2,380,952

UNITED STATES PATENT OFFICE 2,380,952

PROPELLER SHAFT

Clarence L. Dewey, Elkhart, Ind.

Application June 23, 1943, Serial No. 491,902

5 Claims. (Cl. 64—1)

The invention in the form herein shown and described is intended for use as an automobile propeller shaft employed as a driving connection between the transmission and the rear axle, although shafts of like character may be employed for other purposes.

The typical automobile propeller shaft is required to transmit the full torque of the motor multiplied by the greatest gear reduction of the transmission, which is usually about 3 to 1 on low gear and reverse. It is also required to transmit the full motor torque at full motor speed on high gear, and this is usually about 4000 R. P. M. with modern cars and is progressively increasing from year to year as motor speeds increase.

Since with normal design the distance from transmission to rear axle is around six feet, the approximate length of the unsupported propeller shaft is in the neighborhood of five feet. With shafts of such length rotating at such speeds, there is a strong tendency for the shaft to bow outwardly at the center of the span under the action of centrifugal force, and this produces vibration and whip which is destructive and annoying.

This shaft-whip is caused by minute static unbalance of the propeller shaft or may be initiated by deflections caused by road-vibration which act transversely of the shaft. To avoid this difficulty, the shafts are customarily formed of large diameter, thin tubing so as to obtain great rigidity with low mass, so as to minimize the transverse inertia deflections.

To transmit the torsion to and from the shaft, it is customary to have splined connections at each end which may be either external or internal to the shaft and connect it to one or more universal joints. Owing to small relative longitudinal movements of the rear axle and transmission due to road irregularities at least one splined end is allowed to slide lengthwise.

The present invention is directed primarily to the completed shaft itself as well as to the coupling features per se which are designed to conform to the conditions above outlined.

Further objects and details will appear from a description of the invention in conjunction with the accompanying drawing wherein—

Figure 1 is a side view with portions broken away showing the completed shaft with accompanying details showing the configuration at each end; and Figs. 2, 3, and 4 are three views of a section of tubing partly broken away and showing the progressive stages of its reduction and fabrication in form to receive the male and female coupling elements at opposite ends of the shaft with detail views showing the configuration at opposite ends of the shaft in the third and fourth stages of its transformation.

In fabricating the shaft of the present invention, I first employ a section 10 of uniform cylindrical metal tubing of the proper length, diameter, and gauge and subject each end thereof to a reducing operation which may be performed in conformity with the method shown and described in my patent of April 25, 1944, No. 2,347,175, or if desired, I may employ an extended length of tubing adapted to be first configured and afterwards cut into units each of a size to permit completion as a single shaft as described in Dewey Patent No. 2,265,723, issued December 9, 1941. I do not, however, limit myself to the use of either of these methods in initially reducing the ends of the tube to the form shown.

The reducing operation performed as above described or in any other suitable manner, results in the formation at opposite ends of the tube section of tapered shoulder portions 11 and 12 terminating in cylindrical sockets 13 and 14 respectively, the former of which may be termed the male socket, and the latter the female socket. The male socket is of smaller diameter than the female socket, and it will be noted that in each case the wall thickness progressively increases throughout the shoulder portion and retains a maximum uniform thickness throughout the socket portion as shown in Fig. 3.

The ends of the shaft thus reduced are next grooved to provide squared shallow locking splines 15 and intervening grooves which extend in parallel relation throughout the length of the socket.

With the sockets thus grooved the shaft is ready to receive a male coupling stem 16 at the male end of the shaft and a female coupling bushing 17 at the female end of the shaft. The male stem comprises an outer head 18 provided with longitudinal squared coupling splines 19 and intervening grooves 20. The head is formed on the end of a slightly reduced neck 21 which at its inner end merges into an enlarged circumferential ridge 22 behind which the stem is incut to provide a somewhat deeper groove 23 leaving an abrupt shoulder 24 at the juncture of the groove with the adjoining ridge. The stem at its inner end terminates in an enlarged inner head 25 provided with squared locking splines 26 and intervening grooves which are of a width and depth to afford an extremely close driving fit with the complementary grooves and splines of the male socket. This permits the male stem to be driven into place within the socket, and the interengaging grooves and splines are of sufficient depth and so closely interfitted as to resist tortional stresses and vibrations.

With the parts thus united, a closely fitting ferrule 27 of uniform cylindrical form is driven to place around the cylindrical socket end of the shaft until its inner end encounters the taper of the adjacent shouldered portion of the shaft after which both the outer end of the ferrule and the end of the surrounded socket portion are subjected to a reducing or spinning operation which contracts these portions of the structure sufficiently to force the wall of the socket end into groove 23 and the tip of the ferrule to overlap and closely impinge upon the rim of the ridge 22. This offsetting of the end of the socket into the groove 23 provides a shoulder 28 against which the forward ends of the splines 26 of the inner head impinge while the splines at their opposite ends impinge against the terminal end faces of the socket grooves so that the male stem will be rigidly and permanently locked in position and the union this afforded will be even more effective than one afforded by welding, since the temper of the interlocked areas will not be softened or impaired by the effects of heat.

The opposite or female socket of the shaft is proportioned to receive the female coupling 17 provided with shallow squared splines 30 and intervening grooves adapted to closely register and interengage with the grooves and splines of the female socket end of the shaft so that a rigid driving fit may be obtained until the ends of the splines on the coupling socket encounter the ends of the grooves in the shaft end and until the butt of the shaft encounters a shouldered circumferential ridge 31 outwardly protruding from the coupling socket.

The wall of the socket behind the shoulder thus formed is circumferentially grooved at 32, and the coupling socket is provided with a circumferential flange 33 at its tip end within which the inner rim is throated at 34. The socket coupling along its inner wall is provided with a series of squared relatively deep grooves 35 and intervening coupling splines 36 which are complementary to the splines and grooves of a male stem identical with that at the opposite end of the shaft so that a sliding or telescoping fit will be provided at one end of the shaft with a female transmission coupling socket of complementary character which may include a universal joint and at the other end with a male connection associated with the rear axle or a universal joint in train therewith. It will, of course, be understood that the present invention is directed rather to the nature of the shaft and its fittings than to the driving and driven elements with which it is associated and to the provision of male and female elements, of the character described howsoever located within a driving train and so related as to provide a telescoping engagement to compensate for variations in spacing occasioned by vibration or other causes.

The permanent retention of the coupling socket is ensured by driving a ferrule 37 to place on the end of the shaft socket and thereafter reducing both the ferrule and the enclosed end of the shaft to force the shaft wall into the groove 32 and the tip end of the ferrule into contact with the margin of the ridge 31.

It may be desirable, after the shaft has been completely assembled as aforesaid, to subject it to a final reducing and straightening operation in order to perfectly center it with the coupling members in place, and such an operation may be advantageously performed on the apparatus described in Dewey application Serial No. 463,912, filed October 30, 1942, which has the effect of slightly reducing the outside diameter and modifying the taper of the shoulder portions to the configuration shown in Fig. 1 and at the same time hardening the metal and giving it perfect circularity throughout with more perfect balance and alignment with the coupling members. Such a final operation is desirable when extreme precision is required.

The shaft with its fittings formed and fabricated as above described will maintain this original circularity while the interfitted portions, which may be preliminarily hardened or tempered to exact specifications, will be unimpaired by localized heating, so that defects occasioned by warping or distortion in welding will not be present and a final reduction and centering operation, if employed, will serve simply to correct defects in the original tubing.

Although I have here shown a single shaft provided at one end with a male coupling and at its opposite end with a female coupling, it will be understood that like results might be obtained by providing the same type of coupling at both ends of a shaft section with complementary couplings provided in the adjoining members of a transmission train and that the present description is directed rather to the nature of the individual coupling members and the manner of forming and uniting the same with members of a transmission train, than to their conjoint employment in any particular member of the train.

I claim:

1. In an invention of the character described, the combination of a tubular power transmission element having in its end portion a series of interior longitudinally extending locking splines with intervening grooves, and a coupling element having formed therein longitudinally extending coupling splines and intervening grooves adapted to telescope with the grooves and splines of a coupling element of complementary character, the coupling element also having formed on its exterior a series of locking grooves and splines closely interengaging with the interior splines and grooves on the transmission element, and the coupling element having formed on its exterior wall a circumferential groove underlying the end portion of the transmission element, the surrounding wall of the latter being reduced to enter and snugly engage said grooved wall to interlock the parts together, and a ferrule encircling the end portion of the transmission element and having its own end reduced to snugly engage the reduced wall of the transmission element.

2. In an invention of the character described, the combination of a tubular power transmission element having an enlarged body and a socket end portion of smaller diameter connected with the body by a tapering shoulder portion, the wall thickness progressively increasing through the shoulder portion to maximum thickness in the end portion, the latter having therein a series of interior longitudinally extending locking splines with intervening grooves, and a coupling element having formed therein longitudinally extending coupling splines and intervening grooves adapted to telescope with the grooves and splines of a coupling element of complementary character, the coupling element also having formed on its exterior a sereis of locking grooves and splines closely interengaging with the interior splines and grooves on the transmission element, and the coupling element having formed on its exterior wall a circumferential groove underlying the end portion of the transmission element, the surrounding wall of the latter being reduced to enter and snugly engage said grooved wall to interlock the parts together, and a ferrule encircling the end portion of the transmission element and having its own end reduced to snugly engage the reduced wall of the transmission element.

3. In an invention of the class described, the combination of a tubular power transmission element having in its end portion a series of interior longitudinally extending locking splines with intervening grooves and a male coupling element having at its inner end a series of longitudinally extending exterior locking splines with intervening grooves closely interfitted with the locking grooves and splines of the transmission element, and having at its outer end a series of longitudinally extending coupling splines and intervening grooves adapted to telescope with the grooves and splines of a complementary female coupling element, the male coupling element having formed in its exterior wall a circumferential groove and the surrounding wall of the transmission element being reduced to enter and snugly engage said grooved wall to interlock the parts together, and a ferrule encircling the end portion of the transmission element and having its own end reduced to snugly engage the reduced wall of the transmission element.

4. In an invention of the class described, the combination of a tubular power transmission element having in its end portion a series of interior longitudinally extending locking splines with intervening grooves and a female coupling element of tubular form having formed thereon a series of longitudinally extending exterior locking splines with intervening grooves closely interfitted with the locking grooves and splines of the transmission element and having on its interior a series of longitudinally extending coupling splines and intervening grooves adapted to telescope with the grooves and splines of a complementary male coupling element; the female coupling element having formed on its exterior wall a circumferential groove and the surrounding wall of the transmission element being reduced to enter and snugly engage said grooved wall to interlock the parts together, and a ferrule encircling the end portion of the transmission element and having its own end reduced to snugly engage the reduced wall of the transmission element.

5. A tubular transmission shaft tapering toward each end and terminating in a substantially cylindrical first socket portion of relatively smaller diameter at one end and a second socket portion of relatively larger diameter at the opposite end, each of the socket portions having formed on its interior a series of locking splines and intervening grooves, a male coupling element having formed upon its wall at its inner end a series of locking splines and intervening grooves closely interfitting with the grooves and splines of the first socket portion and the coupling element having formed upon its wall at its outer end a series of longitudinally extending coupling splines and intervening grooves adapted to register with the grooves and splines of a coupling element of complementary character, a female tubular coupling element having formed upon its exterior wall a series of locking splines and intervening grooves closely interfitting with the grooves and splines of the second socket portion and the female coupling element having formed on its interior a series of longitudinally extending splines and intervening grooves adapted to register with the grooves and splines of a coupling element of complementary character, each of the coupling elements having formed in its exterior wall a circumferential groove and the surrounding wall of the shaft being rduced at each end to enter and snugly embrace said grooved walls to interlock the parts together, and a ferrule encircling each end of the shaft and having its own end reduced to snugly engage the underlying reduced wall of the shaft.

CLARENCE L. DEWEY.